US010466692B2

(12) United States Patent
Douglas et al.

(10) Patent No.: US 10,466,692 B2
(45) Date of Patent: Nov. 5, 2019

(54) AUTOMATED GUIDED VEHICLE SYSTEM

(71) Applicant: John Bean Technologies Corporation, Chicago, IL (US)

(72) Inventors: Barry Douglas, Doylestown, PA (US); Mark Weninger, Warrington, PA (US)

(73) Assignee: John Bean Technologies Corporation, Chicago, IL (US)

( * ) Notice: Subject to any disclaimer, the term of this patent is extended or adjusted under 35 U.S.C. 154(b) by 116 days.

(21) Appl. No.: 15/864,215

(22) Filed: Jan. 8, 2018

(65) Prior Publication Data

US 2018/0129201 A1    May 10, 2018

Related U.S. Application Data

(63) Continuation of application No. 14/664,587, filed on Mar. 20, 2015, now Pat. No. 9,864,371.

(60) Provisional application No. 62/131,197, filed on Mar. 10, 2015.

(51) Int. Cl.
    *G05D 1/00* (2006.01)
    *G05D 1/02* (2006.01)

(52) U.S. Cl.
    CPC ......... *G05D 1/0027* (2013.01); *G05D 1/0022* (2013.01); *G05D 1/0214* (2013.01); *G05D 1/0225* (2013.01); *G05D 1/0231* (2013.01); *G05D 1/0282* (2013.01); *G05D 1/0297* (2013.01); *G05D 2201/0216* (2013.01)

(58) Field of Classification Search
    CPC ......... G05D 1/0297; G05D 2201/0216; G05D 1/0027; G05D 1/0212; G05D 1/024; G05D 1/0246; G05D 1/0255
    See application file for complete search history.

(56) References Cited

U.S. PATENT DOCUMENTS 4,049,961 A    9/1977  Marcy
4,996,468 A    2/1991  Field et al.
5,367,458 A    11/1994 Roberts et al.
(Continued)

FOREIGN PATENT DOCUMENTS

EP    1 447 354 A1    8/2004
EP    2 044 494 A2    4/2009
(Continued)

OTHER PUBLICATIONS

Crane, G.D., and D.G. Armstrong, "Development of Intelligent Unmanned Systems," Technical Report No. AFRL-RX-TY-TR-2011-0049, Air Force Research Laboratory, Materials and Manufacturing Directorate, Tyndall Air Force Base, Fla., public release date Oct. 4, 2011, 34 pages.
(Continued)

*Primary Examiner* — Redhwan K Mawari
(74) *Attorney, Agent, or Firm* — Christensen O'Connor Johnson Kindness PLLC

(57) ABSTRACT

AGVs receive instructions regarding tasks to be performed via localized wireless I/O communication devices (604) onboard the AGVs from localized wireless communications units (600) positioned about the facility, for example, at conveyors (202). The wireless communications units (600) utilize I/O devices (604) which have a limited range so as to be truly localized in their operation. The AGVs have a sophisticated onboard control system (130) that includes a destination determination system (140), a routing system (142), a navigation system (144), and a crash avoidance system.

25 Claims, 9 Drawing Sheets

(56) References Cited

U.S. PATENT DOCUMENTS

| | | | |
|---|---|---|---|
| 5,845,725 | A | 12/1998 | Kawada |
| 6,208,916 | B1 | 3/2001 | Hori |
| 6,249,743 | B1 | 6/2001 | Ohshimo |
| 6,799,099 | B2 | 9/2004 | Zeitler et al. |
| 6,941,191 | B2 | 9/2005 | Jaeger |
| 6,941,200 | B2 | 9/2005 | Sonoyama et al. |
| 7,066,291 | B2 | 6/2006 | Martins et al. |
| 7,609,175 | B2 | 10/2009 | Porte et al. |
| 7,627,394 | B2 | 12/2009 | Volcic et al. |
| 8,010,230 | B2 | 8/2011 | Zini et al. |
| 8,115,439 | B2 | 2/2012 | Yourlo et al. |
| 8,196,835 | B2 | 6/2012 | Emanuel et al. |
| 8,210,791 | B2 | 7/2012 | Chilson et al. |
| 8,214,081 | B2 | 7/2012 | Choi et al. |
| 8,381,982 | B2 | 2/2013 | Kunzig et al. |
| 8,538,692 | B2 | 9/2013 | Wurman et al. |
| 8,594,923 | B2 | 11/2013 | Wong et al. |
| 8,649,899 | B2 | 2/2014 | Wurman et al. |
| 8,666,548 | B2 | 3/2014 | Lim |
| 8,688,275 | B1 | 4/2014 | LaFary et al. |
| 8,694,382 | B2 | 4/2014 | Aznavorian et al. |
| 8,712,679 | B1 | 4/2014 | Mostofi et al. |
| 9,046,893 | B2 | 6/2015 | Douglas et al. |
| 9,317,034 | B2 | 4/2016 | Hoffman et al. |
| 2005/0149256 | A1 | 7/2005 | Lawitzky et al. |
| 2005/0182518 | A1 | 8/2005 | Karlsson |
| 2007/0269299 | A1 | 11/2007 | Ross et al. |
| 2008/0051985 | A1 | 2/2008 | D'Andrea |
| 2008/0191937 | A1 | 8/2008 | Wisherd et al. |
| 2008/0199298 | A1 | 8/2008 | Chilson et al. |
| 2009/0222159 | A1 | 9/2009 | Bauer |
| 2010/0121517 | A1 | 5/2010 | Lee et al. |
| 2010/0247275 | A1 | 9/2010 | Karlen et al. |
| 2010/0256908 | A1 | 10/2010 | Shimshoni et al. |
| 2010/0286905 | A1 | 11/2010 | Goncalves et al. |
| 2011/0010023 | A1 | 1/2011 | Kunzig et al. |
| 2011/0010033 | A1 | 1/2011 | Asahara et al. |
| 2011/0054791 | A1 | 3/2011 | Surampudi et al. |
| 2011/0153139 | A1 | 6/2011 | Erb et al. |
| 2011/0153338 | A1 | 6/2011 | Anderson |
| 2011/0166721 | A1 | 7/2011 | Castaneda et al. |
| 2011/0313782 | A1 | 12/2011 | DeMeyer et al. |
| 2012/0083923 | A1 | 4/2012 | Matsumoto et al. |
| 2012/0283905 | A1 | 11/2012 | Nakano et al. |
| 2012/0330492 | A1 | 12/2012 | Douglas et al. |
| 2013/0158773 | A1 | 6/2013 | Wu et al. |
| 2014/0247116 | A1 | 9/2014 | Davidson |
| 2014/0350831 | A1 | 11/2014 | Hoffman et al. |
| 2014/0365258 | A1 | 12/2014 | Vestal et al. |

FOREIGN PATENT DOCUMENTS

| | | |
|---|---|---|
| EP | 2 385 435 A1 | 11/2011 |
| EP | 2 500 871 A1 | 9/2012 |
| WO | 2012/166970 A1 | 12/2012 |
| WO | 2014/148975 A1 | 9/2014 |

OTHER PUBLICATIONS

"IEEE 802.11," Wikipedia, The Free Encyclopedia, Feb. 28, 2010, <http://en.wikipedia.org/wiki/IEEE_802.11> [retrieved Apr. 20, 2015], 5 pages.

International Search Report and Written Opinion dated Jun. 6, 2016, issued in corresponding International Application No. PCT/US2016/021448, filed Mar. 9, 2016, 14 pages.

International Preliminary Report on Patentability, dated Jun. 13, 2017, issued in corresponding International Application No. PCT/US2016/021448, filed Mar. 9, 2016, 34 pages.

Second Written Opinion, dated Mar. 8, 2017, issued in corresponding International Application No. PCT/US2016/021448, filed Mar. 9, 2016, 6 pages.

AUTOMATED GUIDED VEHICLE SYSTEM

BACKGROUND

Automated guided vehicles (AGVs) are battery-powered, self-driven vehicles used to transport material and other items from one location to another without any accompanying operator. AGVs are being increasingly used in the material handling industry and are an important part of the shift in production planning from a primary emphasis on high-speed production to also focus on efficient transportation of materials between work stations as well as into and out of storage. AGVs are important in this regard since they are capable of responding to changing transport patterns and can be integrated into modern manufacturing plants, where flexible material handling systems are now required to perform an efficient routing of materials.

Traditional AGV Systems include several common elements. The first of these is a central computer or server that acts as a dispatcher for all AGVs. This AGV central server contains software that provides several functions for the successful operation of an AGV System, as follows:

Traffic Control—Manages the movement of AGVs throughout a facility. This includes sending messages to the AGVs that they are allowed to move a certain distance along a predetermined guide path. All AGVs are simultaneously controlled in this manner so that they do not collide with one another.

Facility Interface—Communicates directly to facility, plant, or warehouse control software. In this manner, the movement of material/products/inventory is coordinated such that the objectives of the facility are met. Communications also occur with facility equipment that the AGVs must service. These communication links are typically accomplished over a facility LAN to a computer server or to programmable logic controllers (PLCs).

Inventory Management—Many AGV systems require the management of facility inventory in a warehouse or similar area. The AGV central server understands the physical layout of the facility and controls the storage and retrieval of product in inventory areas to achieve facility objectives. Some facilities have their own inventory management system, and in these cases the AGV central server functions to move loads as instructed by the high level controller of the facility management system. In most cases, AGVs will receive information about the load they are carrying and pass this information to the AGV central server when the load is delivered.

Order Control—This function creates orders to move materials or inventory in the facility. Orders consist of a pick and then a drop of a load. These orders are then assigned to the AGVs based on a series of rules to optimize overall throughput and utilization of the AGV system. Factors taken into consideration include, for example, the proximity of an AGV to the pick location of an order, battery level of the AGV, assigning an order to the correct type of AGV if they are multiple styles in a system, and meeting specific objectives such as response time to start the order.

Communications—This function manages data communications between all elements of the AGV System. These elements include the AGVs, facility computers and PLCs, battery charging systems, battery exchange locations, automatic doors, elevators, etc. Communications to the AGVs is accomplished over a wireless network which typically already exists in the customer's facility or is provided by the customer as part of the installation of the AGV Systems.

Battery Level Management—This function monitors the battery level of all AGVs and instructs the AGVs to either travel to a location to have the battery automatically or manually exchanged, or to a location where the AGVs automatically connect to a charger when time permits.

Data Management—The AGV central computer is a clearinghouse for all AGV system operational information and therefore is required to process a tremendous amount of data. This data is managed and reports or alerts are generated to assess the current status and performance of the AGV system along with numerous system metrics.

The AGVs in a typical AGV system act like soldiers that take commands from the AGV central server and execute those orders. The AGVs are provided with information about the entire guide/travel path and contain routines that are executed along the guide path as they journey from one location to another. The AGVs execute routines for load picks and drops, but the AGVs do not execute any commands unless instructed by the AGV central server. In addition, the AGVs do not keep track of the work functions they perform, do not manage inventory, and do not retain data about the load they are carrying. This is all accomplished by the AGV central server.

In complex AGV Systems where there are many pick and drop locations, there are also many inventory management and logistics rules. As such, the AGV central server is essential to management of the entire AGV System within the facility. However, in order to successfully implement an AGV system with an AGV central server and to operate such, significant technical resources from the customer are required. Also, a very significant investment must be made in not only the required equipment, but also the programing of the AGV central server and the installation of the AGV system.

Not all material handling situations require, or can justify the cost of, a traditional AGV system with its central computer or server to operate and control the AGVs, especially if the number of AGVs required is modest; for example, in the range of 1-5 vehicles. There is a need for an efficient and reliable AGV system to focus on the routine automated movement of materials in manufacturing plants and warehouses in a decentralized manner, without the necessity of a computer implemented central server or host.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

An automated guided vehicle (AGV) system includes one or more AGVs, a control system onboard the AGV, and a facility communications unit. The onboard AGV control system includes a computer processor, a memory unit, and a communications device. The communications device utilizes wireless input/output (I/O) for receiving and sending communications, including tasks and instructions to be performed by the AGV. The onboard control system also utilizes a routing system for determining travel routes for the AGV to perform the required tasks, and a navigation system to direct the AGV along the determined travel route while avoiding other AGVs and impediments along the travel route. The facility communications unit utilizes a wireless I/O to provide instructions to the AGV for tasks to be performed. The facilities communications unit also receives instructions and information from the AGVs regarding the tasks being performed by the AGVs.

The onboard control system also includes a destination determination system to determine one or more destinations to which the AGV travels to perform the assigned task(s). The determination system determines one or more destinations to which the AGV travels to perform designated tasks by using one or more of the following:

a. Using the destination information provided in the instructions sent to the AGV communications device by the facility communications unit;

b. Using a look-up table stored in the memory of the AGV control system which provides corresponding destination(s) based on the task(s) communicated to the AGV; or c. Touring a facility communications unit that has a capacity to provide the required destination information to the AGV.

As a further aspect of the present disclosure, the onboard communications device of the control system and/or the facility communications unit utilized digital signals and comprise the processor of programmable logic controller (PLC) to interpret such signals and logically filter such signals to facilitate communications between the communications device onboard the AGV and the communications unit of the facility.

In the AGV system of the present disclosure, the onboard communications device and/or facility communications unit utilize wireless I/O communications employing a predetermined messaging protocol.

In accordance with a further aspect of the present disclosure, the facility communications units are operably connected to one or more of the following facility locations or functions: a manually operable control wireless I/O unit, production machinery, conveyor, storage location, loading dock, battery charging station, battery exchange station, door, elevator, ramp, and gate.

In accordance with a further aspect of the present invention, the routing system utilizes a collision avoidance procedure whereby an AGV broadcasts a coded signal via the wireless I/O communications device while traveling in a restricted area to enable other AGVs in the vicinity to receive the coded signal and thereupon refrain from entering the restricted area during the transmission of the coded signal by the AGV traveling through the restricted area.

In accordance with a further aspect of the present disclosure, the AGV control system is adapted to receive data, pertaining to the task being performed, from the facility I/O communications unit when task instructions are provided to the AGV. This task data is stored onboard the AGV, and then the AGV transmits the stored task data to a facility's wireless I/O communications unit at the location of the completion of the task. One of the tasks being performed may be the pick and drop of a load and the task instructions provide information about the load being transported.

In accordance with a further aspect of the present disclosure, the wireless I/O device used by the communications unit operates in a radio frequency range. Such radio frequency range may be between 3 kHz and 300 GHz.

The present disclosure also pertains to a method of operating a materials handling system at a facility utilizing one or more AGVs, with the method comprising:

utilizing facility-based wireless I/O communications units to communicate to the AGVs instructions for tasks to be performed by the AGVs. The AGVs are fitted with wireless I/O communications devices;

receiving the task instructions by the AGV through the AGV's I/O communications devices;

using a route determination system onboard the AGV to determine a travel route for the AGV if the AGV is required to travel to one or more locations to perform the assigned tasks;

using a navigation system onboard the AGV during travel to the one or more required locations via the determined route and avoiding other AGVs or other impediments along the determined travel route; and communicating via the wireless I/O communication device, the completion of the assigned task.

The method of the present disclosure also comprises using a destination determination system onboard the AGV to determine the one or more destinations that the AGV needs to travel to perform its tasks.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
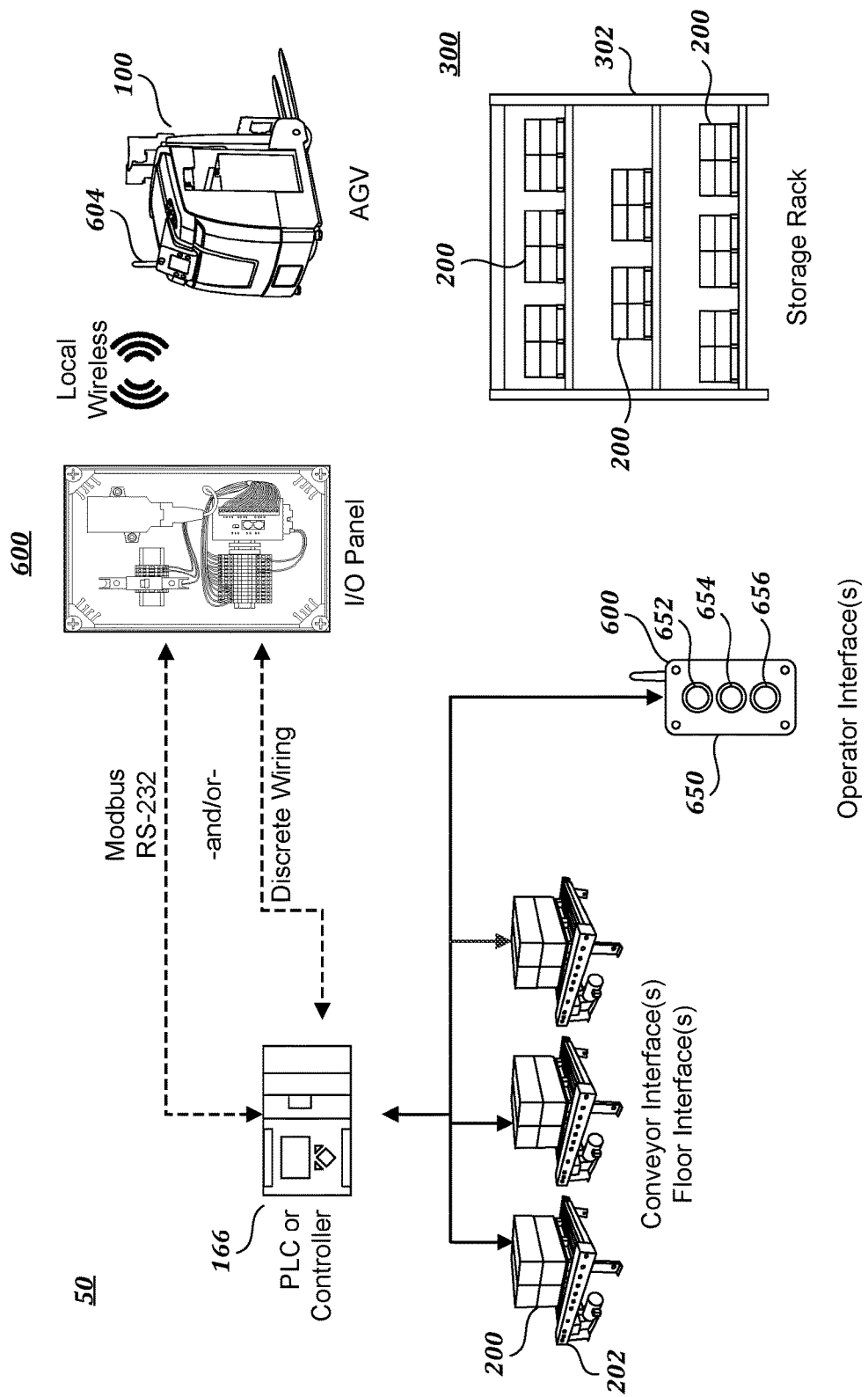
FIG. 1 is a schematic view of a disclosed AGV system in accordance with the present disclosure.

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

The present application includes references to "directions," such as "forward," "rearward," "front," "back," "upward," "downward," "right hand," left hand," "in," "out," "extended," "advanced," and "retracted." These references and other similar references in the present application are only to assist in helping describe and understand the present invention and are not intended to limit the present invention to these directions.

In the following description, various embodiments of the present disclosure are described. In the following description and in the accompanying drawings, the corresponding systems assemblies, apparatus and units may be identified by the same part number, but with an alpha suffix. The descriptions of the parts/components of such systems assemblies, apparatus, and units are the same or similar are not repeated so as to avoid redundancy in the present application.

The present disclosure pertains to decentralized AGV systems. In a basic form, decentralized AGV systems 50 and 50A, schematically illustrated in FIGS. 1 and 2, include at least one AGV 100 utilized to perform various material handling tasks, including, for example, picking up loads 200 from conveyors 202 at production locations at a facility at which the AGV operates. Also referring to FIG. 5, conveyor 200 includes a powered belt 204 that rides over a bed (not shown) which is supported by a frame having side members 206 held above the floor by legs 208. The belt 204 is powered by a motor 210. Of course, the conveyor 202 may be of many other constructions than shown in FIGS. 1, 2, and 5.

Figure 2:
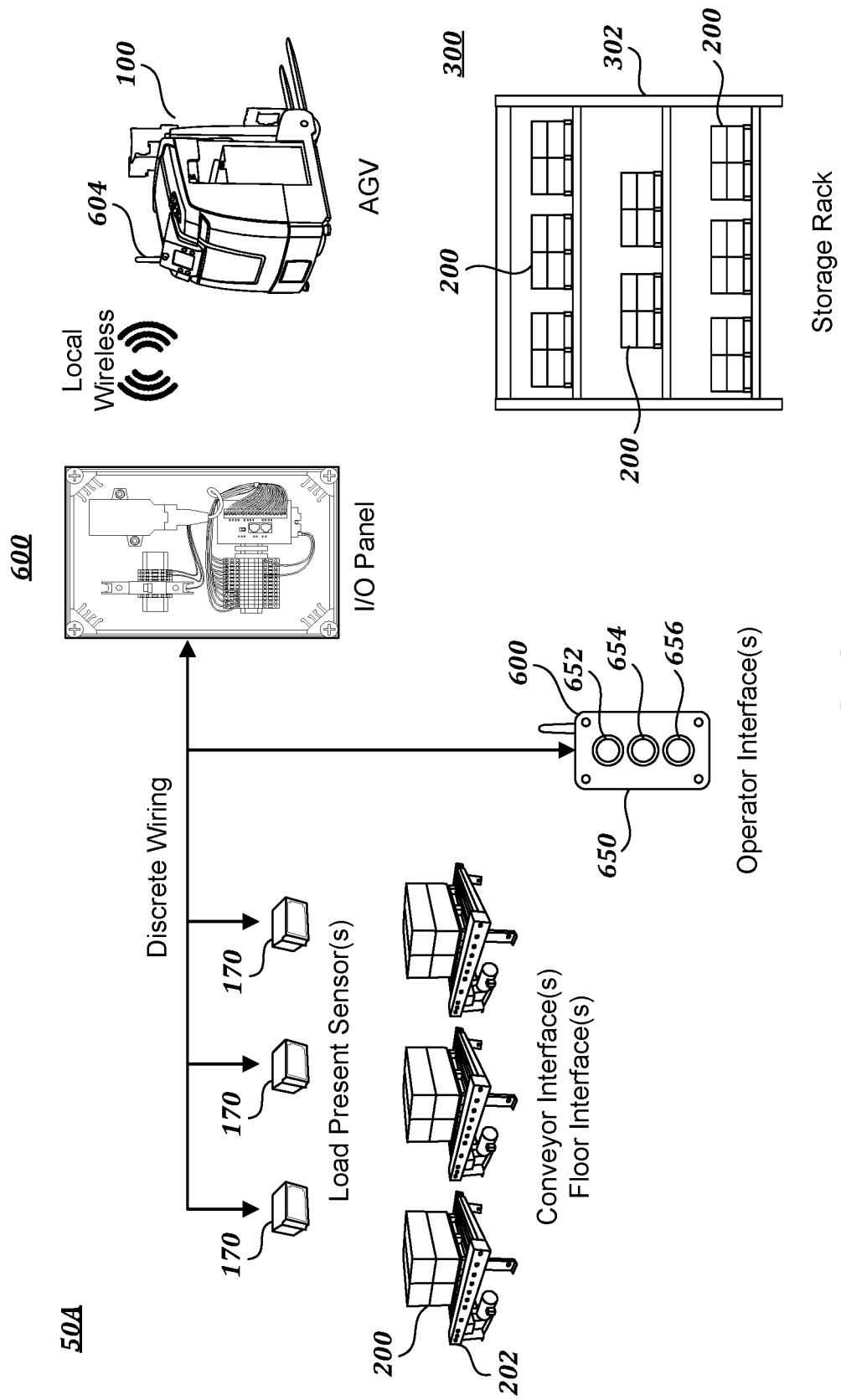
FIG. 2 is a schematic view of a second AGV system in accordance with the present disclosure.
Figure 6:
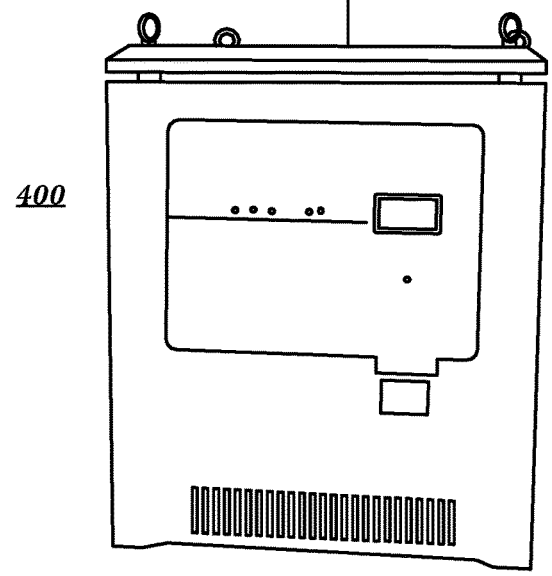
FIG. 6 is a schematic view of an AGV charging station.
Figure 7:
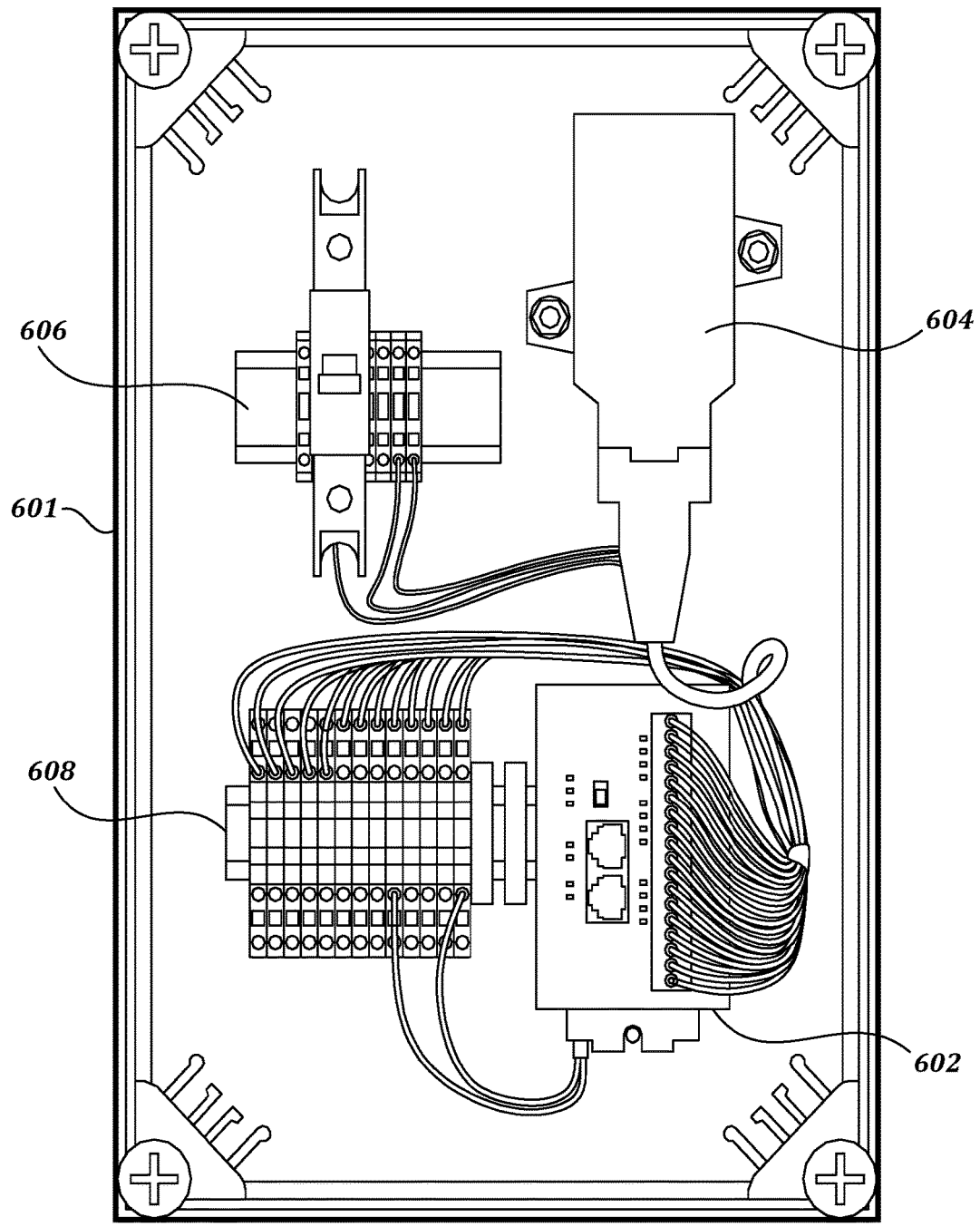
FIG. 7 is an elevation view, partially in schematic, of a wireless I/O communications unit.

Of course, the AGV shown in FIG. 1 or FIG. 2 can be used to perform a myriad of tasks that AGVs of traditional systems perform. The AGV carries the load 200 from the production location to a drop location that may be a warehouse or storage area 300, which is placed onto racks 302. Rather than being placed on a storage rack, the AGVs may carry the load 200 to a loading dock or other location not shown. Other areas of travel of the AGV at a facility may include to a battery charging station 400, as shown in FIG. 6, or to a battery exchange station or to a maintenance station or to a standby location.

Instructions and other communications related to the tasks to be performed by the AGV can be transmitted to the AGV via localized wireless communications devices 604 of communications units 600 positioned about the facility, for example, such communication units 600 can associate with the conveyors 202, battery charging station, or with other locations in the facility. Such communications units can also be incorporated into an operator interface unit 500. The transmission of communications using the communications devices 604 are not through a central control station, as in a traditional AGV system. Rather, systems 50 and 50A utilize wireless input/output (I/O) devices 604, which may have a range limited from about 50 to 100 or 150 meters. Thus, the communication devices 604 and associated I/O units 600 are truly localized in their operation. As noted above, the wireless input/output communication units 600 may be associated with production locations; for instance, conveyors 202, associated with an operator interface 500, associated with storage area 300, and/or with battery charging station 400.

The above general components or aspects of the AGV system 50 and 50A are described more fully below as well as other components or features of the AGV systems 50 and 50A.

As noted above, AGVs 100 are battery-powered, unmanned vehicles capable of transferring loads between locations through paths under computer control. Such AGVs can be of various configurations, including in the form of a towing vehicle capable of towing one or more trailers. Towing vehicles were the earliest AGVs in use.

A second type of AGV is designated as a "unit load" vehicle. This unit load vehicle typically has a wide range of load decks as well as application configurations. The unit load vehicle may be symmetrical, thereby being capable of operating in either (forward/rearward) direction. Unit load vehicles are generally adapted for specific mission assignments, for example, for individual pallet movement. Unit load vehicles typically are used for automatic pickup and delivery of product. They are normally employed in warehousing and distribution systems where guide paths are typically relatively short but volumes are high.

A third type of AGV is the pallet truck, sometimes known as a "stop and drop" vehicle. The pallet vehicle may include a pallet jack or forks. Pallet trucks are often manually loaded and then placed in a guide path and given a destination and then released to that destination. Such vehicles have a capacity typically in the range of about two to three tons, and thus are rather large vehicles.

A further type of AGV is termed an assembly AGV. Typically, this is a specially designed vehicle to carry a product or a portion of a product to various work areas in the manufacturing or assembly process. Such vehicles could be small enough to transport one engine or one transmission, or large enough to transport an entire vehicle. Their load carrying mechanism is typically custom tailored for the specific function to be performed for the specific product to be transferred. Such vehicles are usually integrated into an overall production system. For another purpose, such vehicles can be used in an automated parking garage.

Figure 4A:
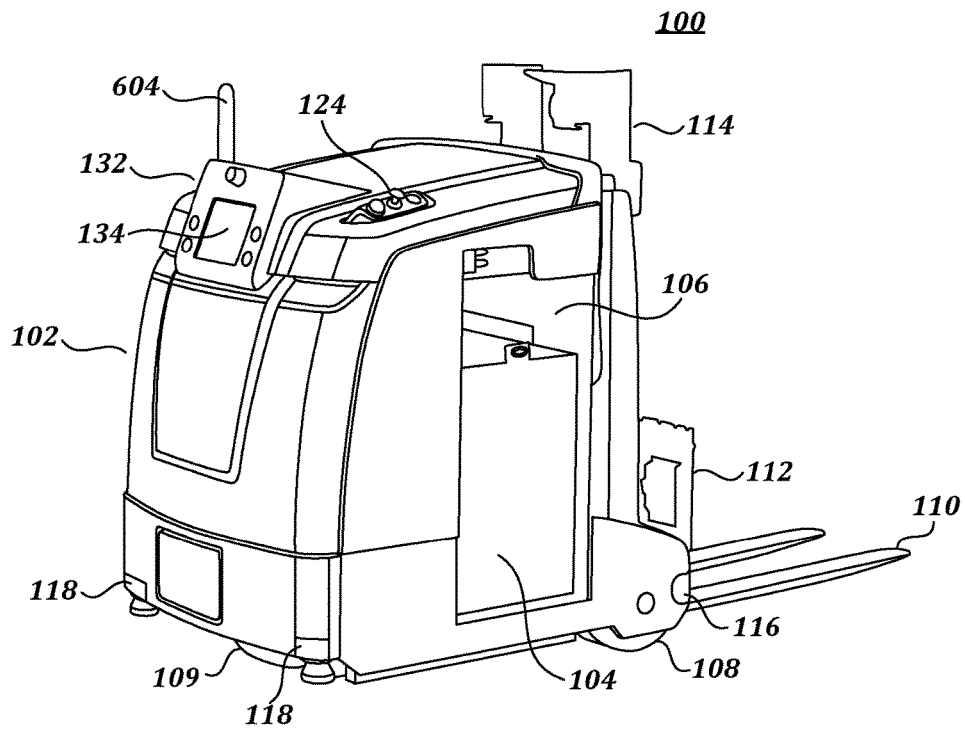
FIG. 4A is an isometric view, partially in schematic, of a fork-type AGV unit.

A further type of AGV is the fork truck 100, as shown in FIG. 4A. The AGV 100 includes a body 102, which houses an electric motor (not shown) powered by a rechargeable battery 104 located in a battery compartment 106. The AGV 100 includes front wheels 108 and is driven and steered forwardly and rearwardly with a drive/steer wheel unit 109. A counterweight (not shown) is located rearwardly of battery compartment 106 to counter or offset the weight carried by forks 110. The AGV forks 110 extending forwardly from a carriage 112 that may be raised and lowered along an upright mast 114. The mast 114 may be of a multi-section telescoping nature to enable the forks 110 to be raised upwardly significantly above the height of the AGV body 102. Also, as typical, the mast may be pivotally mounted on the body at the lower end of the mast, the mast being tiltable fore and aft about such pivot location. Although the forks 110 are shown as extending forwardly of the body 100, the forks instead could be located at the back of the body, or the forks can project outwardly from the side of the body.

As part of the AGV navigation system, a laser-based system may be mounted on the AGV in a typical manner, including front lasers 116 and rear lasers 116.

An operations panel or cluster 124 is mounted in the outer portion of the body, and includes manually manipulatable controls that may be used to manually operate and/or control the AGV.

Figure 4B:
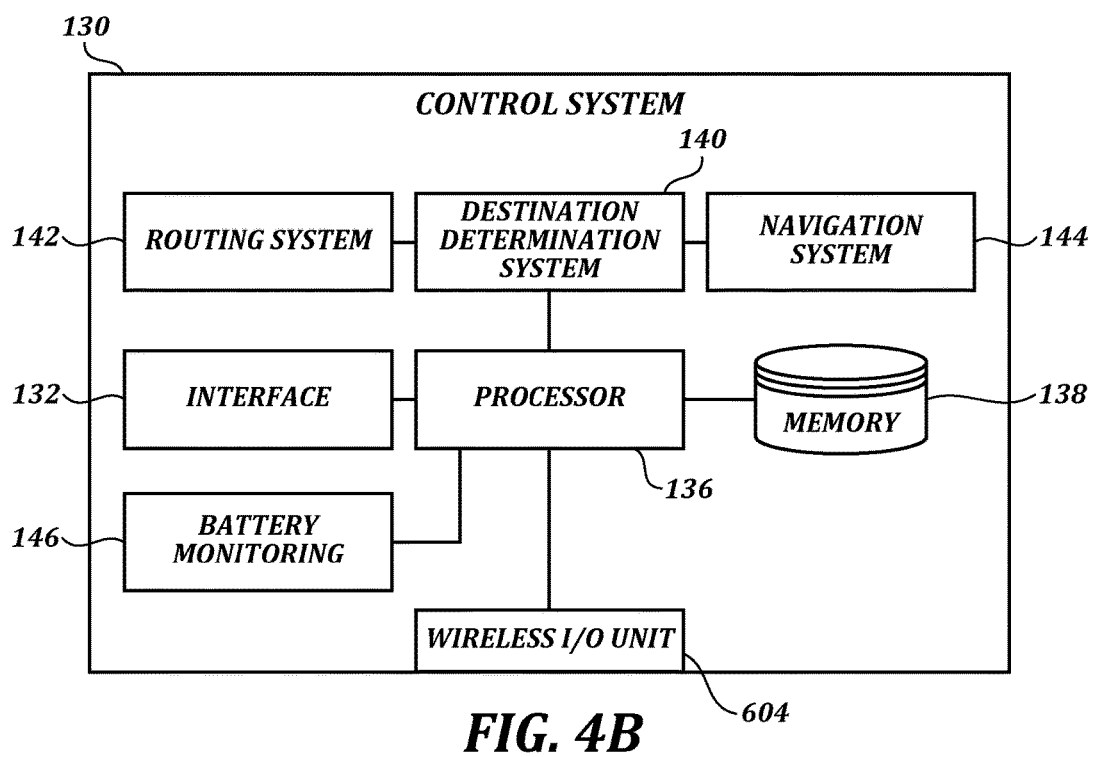
FIG. 4B is a schematic view of a control system for an AGV unit.

The AGV also includes a sophisticated control system 130, shown schematically in FIG. 4B, which is mounted onboard the AGV. The control system 130 includes an interface 132, which includes a touch screen 134, as well as knobs/buttons, that may be utilized to operate, program, service, etc., the control system, see FIG. 4A. The control system includes a processor 136 and an associated memory 138.

As discussed more fully below, the control system 130 includes a destination determination system 140 utilized by the AGV to determine the destination(s) to which it must travel to perform the tasks assigned to the AGV. The control system 130 also includes a routing system 140 used by the AGV to determine route(s) to the destination(s) to which the AGV must travel to perform the instructions received by the AGV. The control system also utilizes a navigation system 144 to navigate the AGV along the determined route required to be traveled by the AGV, and also to prevent collisions with other AGVs or other impediments along the travel route.

Figure 5:
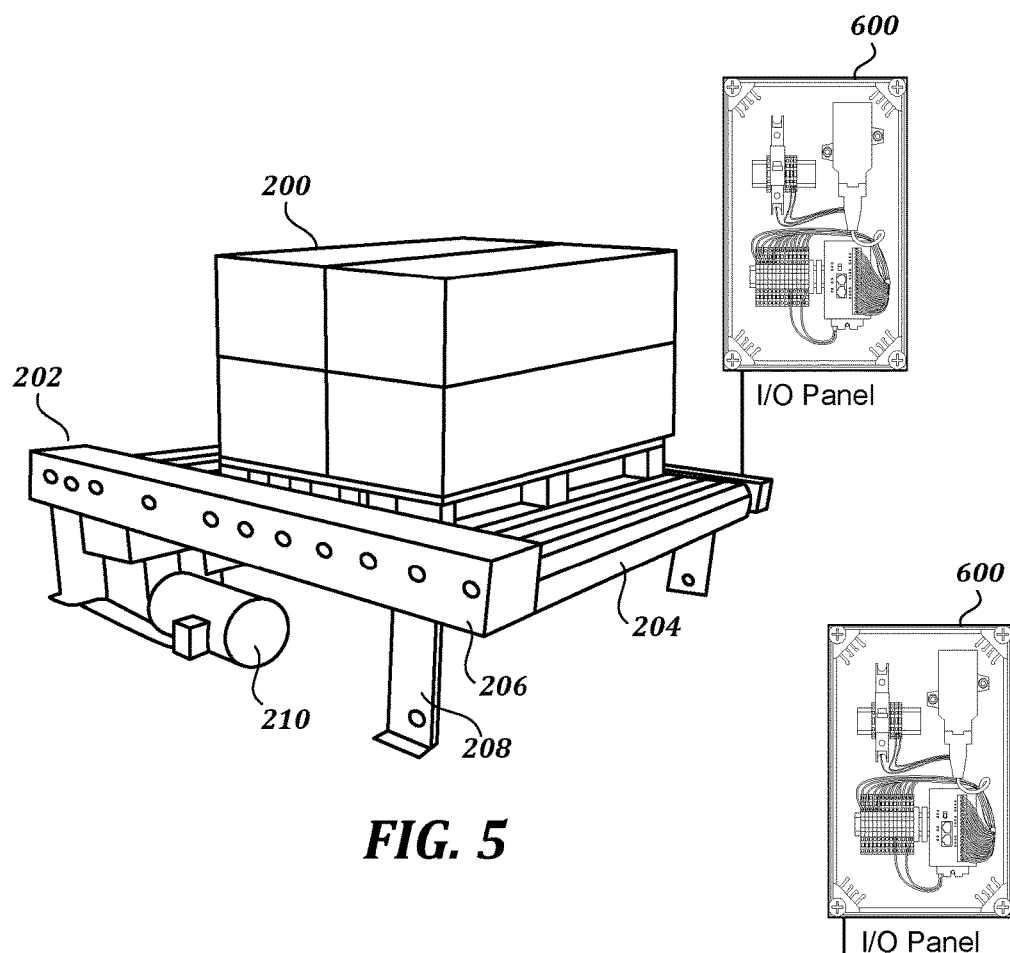
FIG. 5 is an isometric view, partially in schematic, of a conveyor carrying a load to be transported by an AGV unit.

Communications between the AGV and functional units of the AGV system can occur directly by a wireless input/output (I/O) communications device 604 shown in FIG. 4B. Similar I/O communications devices 604, contained within the wireless I/O unit 600, are associated with production locations in the facility and with storage locations in the facility, as shown in FIGS. 1 and 2 and 5, with battery charging station 400 shown in FIGS. 3C and 6, as well as with a door 700 shown in FIG. 3A or an elevator 750 shown in FIG. 3B. These are only a sample of the locations at a facility that may utilize communications units 600. Thus, communications that occur within the AGV systems 50 and 50A occur by localized wireless I/O communications units rather than through a central local area network system, which would require a central computer or host to operate.

Referring to FIGS. 1-3C and 7, the wireless communications unit 600 is illustrated as including a housing 601 within which is mounted a PLC 602 and a wireless I/O device 604. The wireless I/O device 604 can be of numerous types, including a radio frequency device that meets the requirements of IEEE 802.14.5. The housing 601 also contains a power supply (not shown) as well as circuit protection 606 and field terminals 608 wired to the PLC 602. The communications unit 600 is capable of receiving a number of discrete inputs and then converting such inputs to discrete outputs, which are wirelessly communicated to another I/O communications device 604 within the transmitting range of the I/O device 604. The input signals to the I/O communicator unit 600 may be transmitted by discrete wiring from a transducer, a programmable logic controller (PLC), a controller, or other device. In this situation, the serial signals received by the PLC 602 use a predetermined messaging protocol to output instructions, data, or other communications via the wireless I/O device 604.

Alternatively, the inputs to the I/O communicator unit 600 may be wireless, for example, via RS-232 Modbus as shown in FIG. 1. Such digital signals are interpreted by the PLC and logically filtered and then transmitted by the wireless I/O device 604. In FIG. 1, a PLC or controller 166 is associated with the conveyor 202, which is capable of transmitting signals and data to the I/O communications unit 600. For example, when a load 200 is ready for pick up at conveyor 202, the PLC or controller 166 may call the AGV 100 via the communications unit 600 to the location of the conveyor 202 to pick up the load 200. The PLC or controller 166 may also provide data with respect to the destination or drop location for the load 200, and also perhaps an entire or a portion of a proposed route to be taken by the AGV. The PLC or controller 166 may also provide information pertaining to the content or composition or other information about the load 200. This information may be transmitted by the conveyor I/O communications unit 600 to the I/O communications device 604 onboard the AGV, and then such information is stored in the memory of the AGV. Such information may then be carried by the AGV to the drop location and then transmitted by the AGV to an I/O communications unit at the drop location. When such product information is transmitted by the AGV to the drop location I/O unit, then such information is cleared from the active memory of the AGV.

Referring to FIG. 2, rather than utilizing a PLC or controller 166 in conjunction with conveyor units 202, instead load sensors 170 may be installed at conveyors 202. When a sufficient load is sensed by a sensor 170, a signal is sent to a discrete input of the I/O communications unit 600 which then converts the received signal to an instructional signal, which is transmitted to the I/O communications unit of an AGV to instruct the AGV to pick up the load 200 from the conveyor 202 and transmit the load to a warehouse or storage location 300 or to another location(s).

In addition, or in alternative, to the above-described processes for instructing an AGV via production machinery or conveyor related PLC/controller and associated I/O communicator 600, a simple operator interface 650 may be used instead, see FIGS. 1 and 2. The interface 650 may simply utilize buttons 652, 654, and 656 for the transmission of different instructions to the AGV. For example, a separate button may be used for each of the separate conveyors 202. In this regard, it may be that only a partial load 200 has been produced and is ready for pickup at the conveyor. In this instance, the operator interface can override the load sensors 170 of FIG. 2 or the PLC or controller 166 of FIG. 1.

It is also to be understood that in the systems 50 and 50A, the AGVs 100 may periodically poll the I/O communications units 600 of a conveyor 202 to query whether a load 200 is ready for pickup at the conveyor. If a load 200 is ready for pickup, because information in this regard has already been transmitted to the I/O communications unit 600 of the conveyor by the PLC/controller 166 or by the transducers 170, the I/O communications unit 600 of the conveyor then replies in the affirmative to the I/O communications device 604 of the AGV, whereupon the AGV travels to the conveyor for pickup of the load 200.

Once a request for load pickup is issued by the I/O communications unit 600 of the conveyor, such communications unit also broadcasts a warning signal to prevent other AGVs from entering the pickup area so as not to cause a collision, a conflict, or even congestion in the area of the conveyor unit. Such warning signal broadcast by the I/O communications device 604 may also instruct the conveyor 202 to stop operation or otherwise assume a state of operation needed so that the AGV 100 can retrieve the load 200 from the conveyor 202. Once the AGV 100 has picked up the load and cleared the pickup area, then the signal broadcast by the I/O communications unit terminates so that other AGVs can travel to or through the pickup area, and so that the plant equipment may also resume operation. As can be appreciated in this manner the travel of AGVs is controlled and managed in a decentralized manner not requiring a central server to manage the traffic flow of the AGVs during their operation.

Returning to the control system 130 of the AGVs, the control system includes a destination determination system 140. The system is used to identify the location(s) where the assigned task(s) are to be performed, for example, where the load 200 is to be delivered. The destination determination system 140 can operate in several different ways. For example, the I/O communications device 604 of the conveyor 202 may not only transmit pickup information to the I/O device 604 of the AGV, but also may provide the destination location for the load. This information is then held in the destination determination system of the control system.

As an alternative, the pickup location could be automatically linked to a drop location. A lookup table may be stored in the memory 138 of the AGV which can be queried by the destination determination system 140 based on the location of the load pickup. Once a pickup order is received, the destination determination system 140 will query the AGV memory 138 to determine whether or not a specific drop location has been associated with the pickup location so that the routing path to such location can be determined, as described below.

As a further alternative, once load 200 has been picked up by an AGV, the AGV may be programmed to automatically travel to a predetermined location in the facility where the AGV communicates with another system I/O communications unit 600. This communications I/O unit may in turn communicate with a PLC, machine, controller, etc., which determines the drop location of the load. The AGV then determines a route to such location and thereafter proceeds to that location to drop the load.

Once the destination or destinations to which the AGV must travel to perform its function(s) is determined, then the routing system 142 of the control system 130 is utilized to plan or determine the travel route of the AGV. The routing system includes a software module for travel path planning. Such software module may utilize algorithms of the type known to those skilled in the art. The pickup and drop off location(s) for a load is provided to the routing system; then the routing system determines a sequence of moves or path segments for the AGV to travel through the facility.

The onboard control system 130 also includes a navigation system 144 to control the operation of the AGV so that the planned path is followed. In this regard, the navigation system 144 makes sure that the movements, turns, etc., of the AGV are accurately made throughout the travel of the AGV in the facility and makes necessary correction to the direction of travel of the AGV as needed. Also, it is important that the navigation system 144 require minimal installation time and effort at the facility to become operational. To achieve these goals, two navigation technologies can be utilized separately or in combination.

A first navigation system consists of a laser system that is capable of identifying reflective targets mounted strategically throughout the facility. Such targets may be at floor level, be above floor level, or in the ceiling. These targets are surveyed by the navigation system to determine their exact location within the facility coordinate reference frame. The rotating laser(s) installed on the AGV receives reflections from the targets as the AGV travels about the facility. The AGV utilizes this data to triangulate its location as it travels. Laser navigation systems of this nature are disclosed in U.S. patent application Ser. No. 13/485,492.

A second navigation system involves using the natural features of the facility to determine the location of the AGV. In this system, when an AGV arrives at a facility or site, the AGV is placed in a data-collecting mode to "drive around" the facility at every location where the AGV is expected to travel. During this process, safety laser units on the AGV measure the distance and angle to every feature seen by the safety laser in a plane just above floor level. This data is then used to create a map of all the features in the facility and the exact locations of such features so that such features can be used as references for vehicle navigation. Once the map of the facility is created, the AGV uses the mapped features to triangulate its location as it travels about the facility. This approach has the advantage of not requiring any reflective targets or other infrastructure to be installed in the facility, but instead uses the existing facility features. If more precise navigation location is required than possible using the "natural feature" system, then traditional reflectors can be installed at the facility. The mapping processing will also recognize and incorporate such reflectors into the navigation system when creating the map of the "natural" features of the facility.

As the AGV 100 travels along its planned path, the control system 130 must ensure that the AGV does not collide with another AGV especially at intersections or as the AGV approaches a stationary AGV. In this regard, peer-to-peer communications between AGVs provides a solution to both route planning and collision avoidance with other AGVs. When an AGV approaches an intersection, it is capable of "listening" to determine if another AGV is in that intersection area. If no other AGV is in the intersection area, the first AGV broadcasts a warning code indicating that it is in the intersection area, which thus warns the other AGVs to not enter the area. Once successfully through the intersection, the AGV terminates its broadcast that it is in the intersection area. If an AGV attempts to enter an intersection area and receives a broadcast signal, such AGV stops outside the intersection area and waits for the AGV in an intersection to clear and subsequently stop broadcasting a warning code. Thereafter the stopped AGV can then proceed. This approach of creating an intersection "token" can be used not only at intersections, but also at any area in which it is necessary to restrict other vehicles from entry, for example, in the narrow passageway where to AGVs cannot pass each other side to side.

Another traffic control/collision avoidance methodology, especially in straight path sections, is to use the AGVs safety lasers to detect the AGV located in front and then stop its travel. This will work well in straight or nearly straight paths, but is less secure and reliable for intersections, thus a combination of the foregoing two methods can be used to achieve a successful collision avoidance system.

In a traditional AGV system, doors, elevator, gates, ramps, and other similar facility access-related features have been operated by the central controller or computer system. In a traditional system, the central computer may be aware that an AGV is approaching a door, elevator, ramp, or gate, and automatically opens or otherwise operates the door, elevator, ramp, or gate, bearing in mind the destination of the AGV. In other systems, the AGV may signal the central computer that it is approaching a door, elevator, ramp, or gate and asks for access thereto. The central computer then either grants or denies access based on set priorities, such as the presence of other AGVs, etc. If permission is granted, the central computer operates the door, elevator, gate, or ramp to provide access by the AGV.

In the decentralized AGV system of the present disclosure, the AGV itself is responsible for operating a door, elevator, ramp, or gate by using its onboard I/O communication device 604 to communicate with the corresponding I/O communication unit 600 of the door 700 (FIG. 3A), elevator 750 (FIG. 3B), ramp, or gate to request, for example, a door 700 to be opened or the elevator 750 to be called, and then the elevator sent to the desired floor, the gate to be opened, or the ramp to be raised or lowered as applicable. If the door 700, elevator 750, gate, or ramp is already in use by another AGV, then the I/O communication unit 600 of the door 700, elevator 750, ramp, or gate denies access until the prior AGV has cleared thereupon the instructions by the approaching AGV will be carried out. It will be appreciated that the AGV is capable of operating and navigating through doors, elevators, gates, and ramps without the need of a central server or computer system.

Figure 3A:
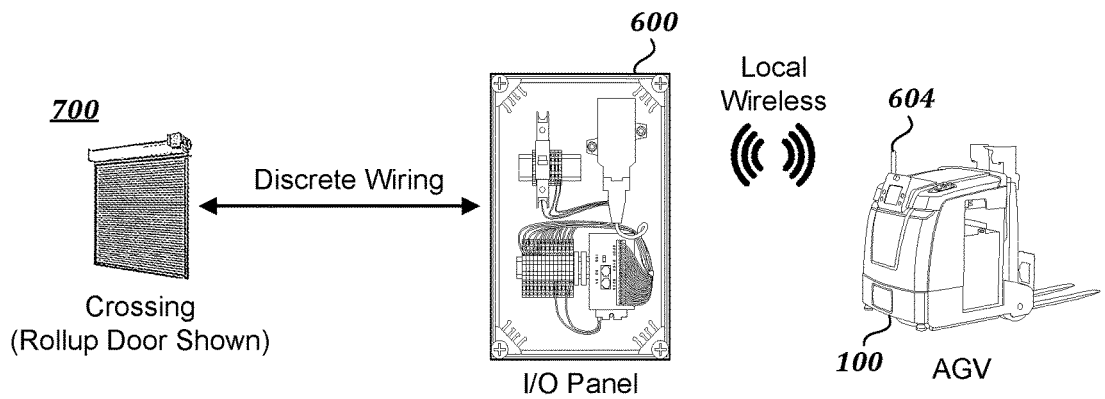
FIG. 3A is a schematic view of a portion of an AGV system in accordance with the present disclosure pertaining to controlling the operation of a door by an AGV unit.
Figure 3B:
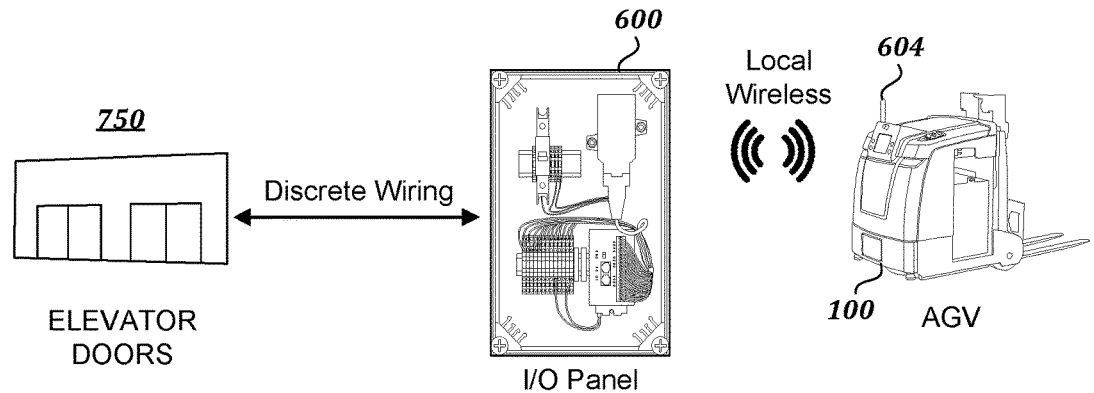
FIG. 3B is a schematic view of a portion of an AGV system according to the present disclosure pertaining to the control of an elevator by an AGV unit.
Figure 3C:
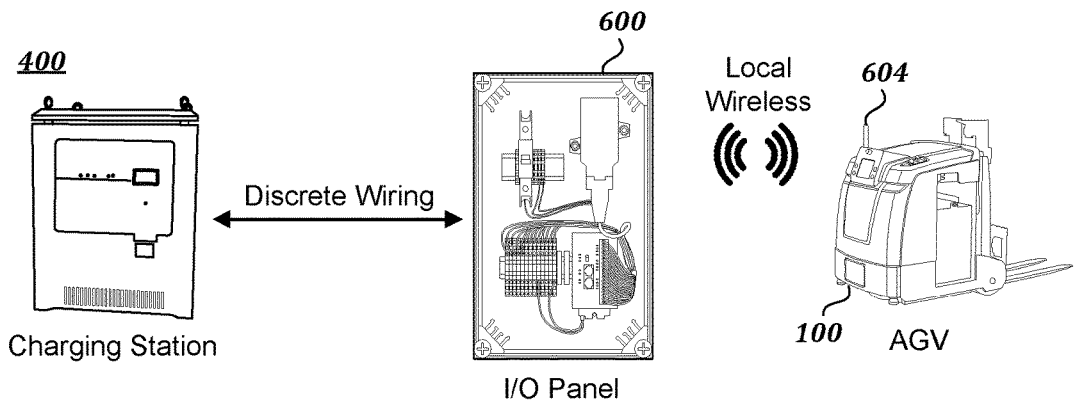
FIG. 3C is a schematic view of a portion of an AGV system of the present disclosure pertaining to AGV charging station.

Referring to FIGS. 3C and 6, in addition to moving loads from a production facility to a storage or warehouse location, the AGV system must be able to accomplish other tasks, including either replacing or recharging the AGV's battery as needed. The AGV control system 130 has a battery monitoring module 146 that monitors the charge level of battery 104. If the AGV's battery 104 requires charging, the battery monitor will instruct the AGV to travel to the charging station 400, as schematically illustrated in FIGS. 3C and 6. An I/O communications unit 600 is wired or otherwise functionally connected to the charging station to receive communications from an AGV that the AGV is traveling to the charging station to have its battery recharged.

The AGV is capable of automatically engaging an interconnection at the battery charging station 400 so that human intervention is not needed to connect the battery 104 to a power charging source at the charging station. If the charging station 400 is occupied, the communications unit 600 of the station sends a signal to the AGV I/O device 604 that the station is not available so that the AGV can travel onto a different charging station.

The locations of all the charging systems are stored in the memory of the AGV control system 130. Once an AGV has been fully charged, it automatically disengages from the charging station and travels to a standby location, which may be near an assigned load pickup location, so that other AGVs can utilize the charging station. Such standby locations are also stored in the memory of the AGV control system 130.

Rather than charging the battery 104 of the AGV 100, if the AGV needs to remain in service, the depleted battery of the AGV may be replaced with a fully charged battery at a battery replacement station, not shown. The operation of the battery replacement station could be similar to that described with respect to the battery charging station. In this regard, at the battery replacement station, the battery can be automatically replaced once the AGV arrives at the battery replacement station. The depleted battery removed from the AGV can be charged at the battery replacement station and thereafter be available for use by the same or other AGV.

Figure 8:
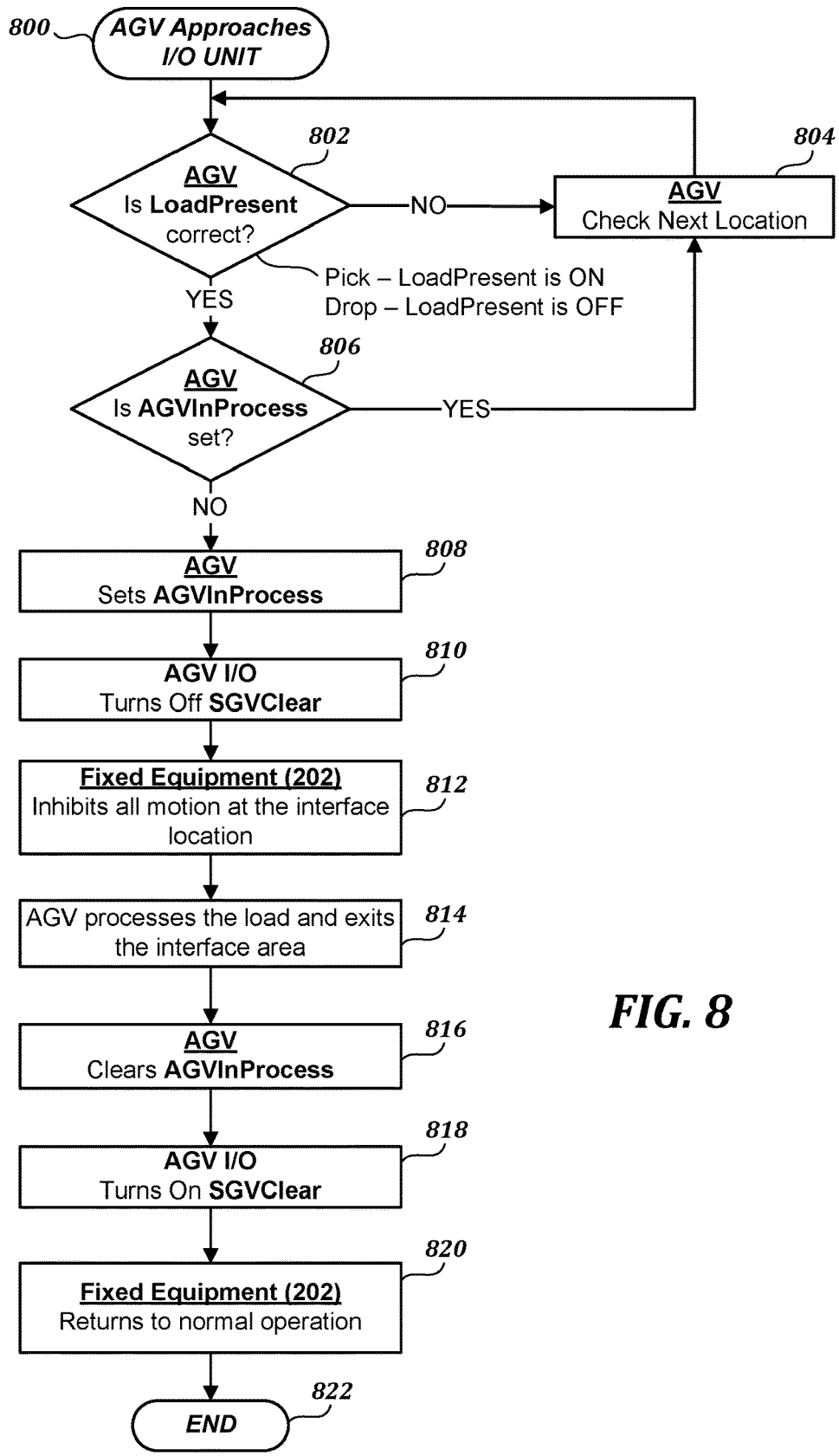
FIG. 8 is a flow diagram illustrating the use of the present AGV system for calling an AGV to pick up a load, and thereupon prevents other AGVs from operating in the load pickup area.

Next, referring to FIG. 8, a flow diagram is provided that generally corresponds to the AGV systems illustrated in FIGS. 1 and 2. As shown in FIG. 8, an AGV that is available to receive instructions automatically travels to one of the pickup locations to which the AGV is assigned. Step 800 corresponds to the AGV approaching a production or pickup location and the I/O communications unit thereof. The AGV instructs its I/O communication device 604 to query the I/O communication unit 600 of the conveyor, machinery, or other equipment to ask whether a load to be picked up is present, see step 802. If a load is present, this condition would have already been communicated to the I/O communications unit 600 of the conveyor or equipment. If a load is not present, then the AGV checks the next potential location, see step 804.

On the other hand, if a load is present, then in step 806 the AGV queries the I/O communications unit 600 of the conveyor/equipment to determine whether an "in process" signal is being broadcast by the I/O communications unit. If such signal is being broadcast, that means that the load is already being picked up by another AGV thereby causing the current AGV to check the next location for an available load, see step 804.

However, if the conveyor/equipment I/O communications unit is not broadcasting that a pickup is in process, then the AGV instructs the equipment to begin broadcasting via the equipment I/O communications unit 600 an "in process" signal at step 808. At that time, the AGV turns off its "AGV clear signal," which it would be broadcasting if it was not in the process of picking up a load, navigating through a restricted area, dropping a load, etc., and the AGV travels to the pickup interface location, see step 810.

During the pickup process, the operation of the conveyor or other equipment is suspended as needed to enable the AGV to pick up the applicable load. Also, other AGVs, when receiving the "in processes" broadcast from the I/O communications unit of the conveyor/equipment, are prohibited from entering the interface locale of the conveyor/equipment. See step 812.

In step 814, the AGV picks up or otherwise processes the load and then exits the interface area. Once the AGV clears the interface area, it instructs the I/O communications unit of the conveyor/equipment to clear the "in process" signal broadcast, see step 816. Thereupon, the AGV turns on its "AGV clear signal," see step 818. Then at step 820, the conveyor and other equipment return to normal operation, and the pickup of the load has been completed, which is designated by the end step 822.

Figure 9:
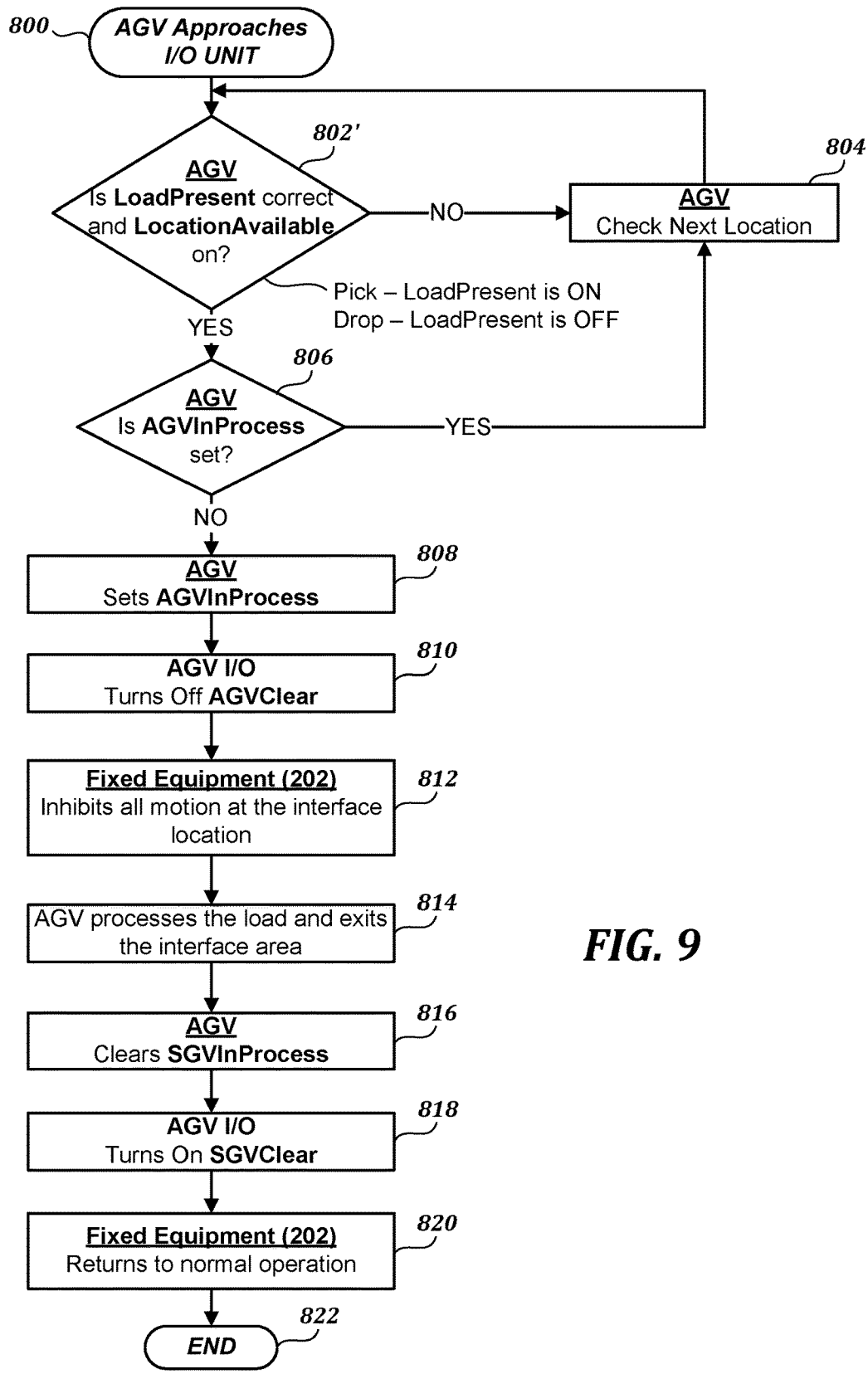
FIG. 9 is a flow diagram similar to FIG. 8, but also informing the AGV if the drop location of the load is occupied or otherwise not accessible.

FIG. 9 illustrates a load pickup protocol very similar to that of FIG. 8, and thus the corresponding steps are identified with the same part numbers. In FIG. 9, step 802' differs somewhat from the corresponding step 802 of FIG. 8. In FIG. 9, in step 802', the AGV queries the I/O communications unit of the conveyor/equipment to not only ask whether a load is present, but also queries whether or not the drop location is available or unavailable, and thus in the methodology of FIG. 9, a load will not be picked up if the drop location for the load is not available. Rather, the AGV will move on to the next potential load pickup location, see step 804. However, if a load is present and the drop location is available, then the pickup process continues on to step 806 in a manner described above with respect to FIG. 8.

Figure 10:
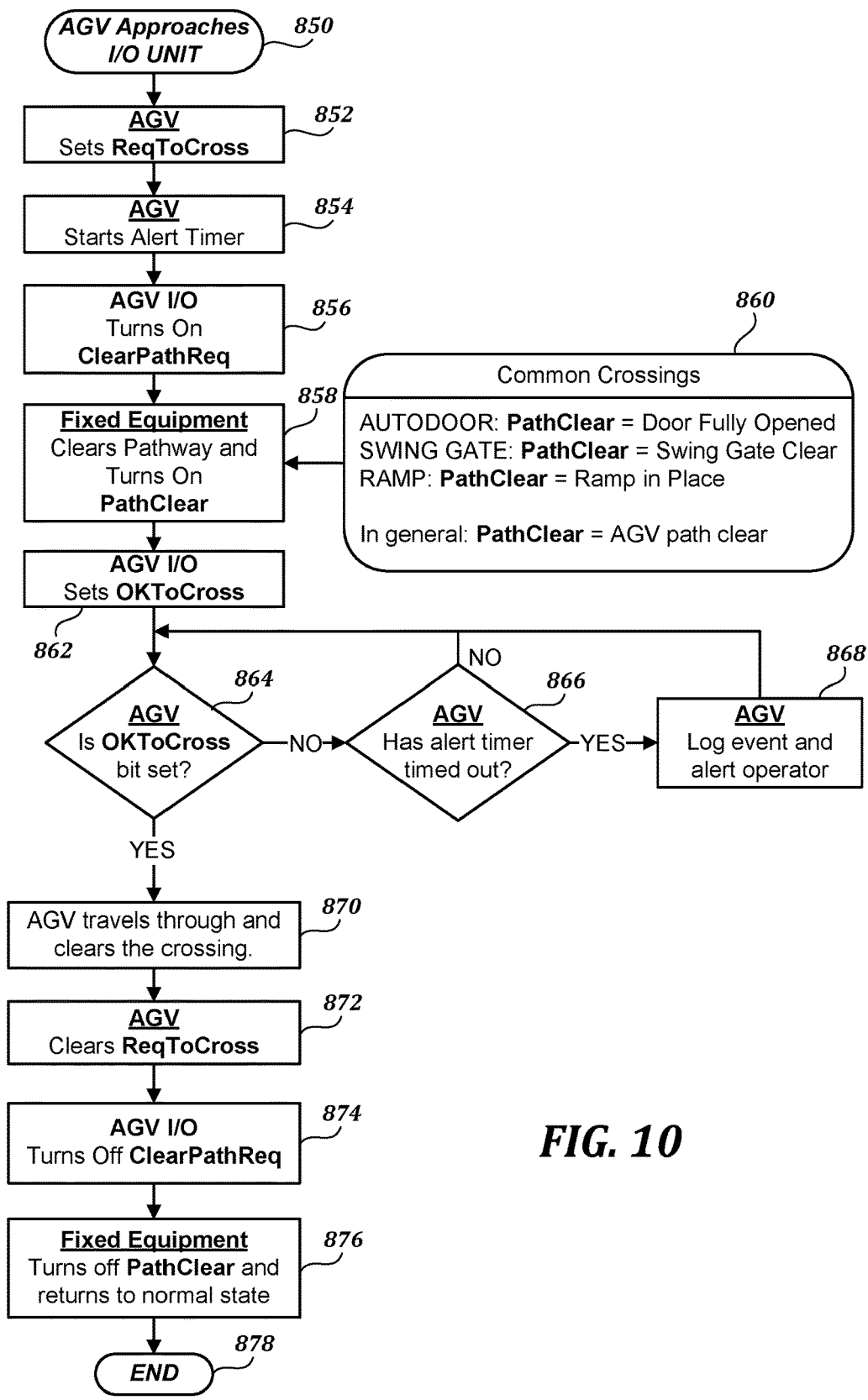
FIG. 10 is a schematic view of the operation of a door by an AGV.

FIG. 10 is a flow diagram of the methodology used for an AGV to operate a door, swing gate, ramp, or similar crossing/entry portal. Examples of a roll-up door 700 and elevators 750 are shown in FIGS. 3A and 3B. In step 850, the AGV approaches the crossing/portal location and sends a bit signal to its I/O communication devices to ask that a "request to cross/pass" signal be sent to the gate, door, ramp, etc., see step 852. Simultaneously, the AGV starts an alert timer, see step 854, which may come into play if the AGV crossing or entry does not occur within a set period of time, as discussed below. The AGV I/O communications unit at step 856 sends a request to the gate, door, ramp, etc., requesting crossing/passage, see step 856. At step 858, the gate opens, the door opens, the ramp moves into place, etc., and the I/O communications unit at such location broadcasts a "path clear" signal to the approaching AGV.

The AGV queries its I/O communications unit to determine if the "okay to cross" signal has been received from the door, gate, ramp, etc., in other words determining whether the "okay to cross" bit has been set in the AGV communications unit. If such "okay to cross" bit has not been set, then the AGV determines whether or not the alert timer has been timed out, see step 866. If not, then a subsequent "okay to cross" bit set inquiry is made. However, if the alert timer has timed out, then this event is logged and the AGV system operator is alerted, see step 868. This could indicate that the door, elevator, etc., is not operating properly.

However, if the "okay to cross" bit has been set, then the AGV makes the crossing and clears the area, see step 870. Thereupon, the request to cross signal by the AGV is terminated and the "clear path" signal of the AGV I/O communications unit 600 is also terminated, see step 874. Thereupon, the "clear path" signal being issued by the door, gate, ramp, etc., is turned off and is returned to normal operations, see step 876. At this point, the crossing has been completed, which is designated by the end step 878.

While illustrative embodiments have been illustrated and described, it will be appreciated that various changes can be made therein without departing from the spirit and scope of the invention. In this regard, the foregoing description of the AGV system and materials handling method describes the use of AGVs with respect to picking loads from conveyor 220 and dropping the loads at storage area 300. The present materials handling system and method can be used in conjunction with many other tasks or purposes, including: moving production components, assemblies, or subassemblies from place to place; transporting loads from a storage facility to a loading dock; transporting loads from a receiving/loading dock to a storage location; transmitting loads from a loading/receiving dock to a production machine; moving materials or components from a storage location to a production machine; etc. In each of these situations, a host control system is not required; but rather, the functionality of the host system is incorporated into the AGVs. In this regard, local communications occurs between the "smart" AGVs and the plant equipment/plant gateways/plant storage areas/ plant receiving and loading docks.

The embodiments of the invention in which an exclusive property or privilege is claimed are defined as follows:

1. A decentralized automated guided vehicle (AGV) system for a facility operating without a centralized host control system, comprising:
   a. one or more AGVs into which functionalities of a facilities host control system have been incorporated;
   b. a control system onboard the AGV, said control system comprising:
      a computer processor;
      a communications unit utilizing wireless input/output ("I/O") for receiving and sending operating communications over a limited distance, including task(s) to be performed to the AGV;
      a routing system for determining travel routes for the AGV to perform the required task; and
      a navigation system to direct the AGV along the determined travel route; and
   c. a plurality of communications units operating over a limited distance at the facility, the communication units positioned at locations about the facility where tasks are to be performed, comprising utilizing wireless I/O to provide instructions directly to the AGVs for tasks to be performed by the AGVs, and also to receive instructions or information directly from the AGVs regarding the tasks assigned to the AGVs.

2. The system according to claim 1, wherein the onboard communications unit of the control system and/or the facility communications unit utilizes digital signals and comprising a processor or programmable logic controller ("PLC") to interpret signals and logically filter signals to facilitate communications between the communications unit onboard the AGV and the communications unit of the facility.

3. The system according to claim 1, wherein the onboard communications unit and/or facility communications unit utilizes serial wireless I/O communications employing a predetermined messaging protocol.

4. The system according to claim 1, wherein said onboard control system further comprises a destination determination system to determine one or more destinations to which the AGV needs to travel to perform assigned task(s).

5. The system according to claim 4, wherein the destination determination system determines the one or more destinations to which the AGV needs to travel to perform designated tasks, by one or more of the following:
   a. using the destination information provided in the instructions sent to the AGV communications unit by the facility communications unit;
   b. using a look-up table stored in the memory of the AGV control system that provides corresponding destination (s) based on the task communicated to the AGV; or
   c. querying a facility communications unit that has the capacity to provide the required destination information to the AGV.

6. The system according to claim 1, wherein the facility communications units are operably connected to one or more of the following facility locations or functions: a manually operable control wireless I/O unit; production machinery; conveyor; storage location; loading dock; battery charging station; battery exchange station; door; elevator; ramp; and gate.

7. The system according to claim 1, wherein the communications unit of the AGV control system optionally comprises a wireless local area network (LAN) receiver/transmitter capable of communicating with the facility wireless LAN (WLAN).

8. The system according to claim 1, wherein said routing system comprises a collision avoidance procedure, whereby an AGV broadcasts a coded signal via its wireless I/O communications unit while traveling in a specific area to enable other AGVs in the vicinity to receive the coded signal and thereupon refrain from entering the specific area during the transmission of the coded signal by the AGV traveling through the restricted area.

9. The system according to claim 1, wherein the navigation system of the control system comprises one or both:
   a. a laser navigation that transmits signals that are reflected back to the navigation system; and
   b. a natural navigation system using existing facility features that are mapped by the natural navigation system and then sensed by the natural navigation system during travel of the AGV, thereby to determine the location of the AGV.

10. The system according to claim 1, wherein the AGV control system is adapted to receive data pertaining to the task being performed from the facility wireless I/O communications unit when task instructions are provided to the AGV, the AGV transmitting the updated task data to a facility wireless I/O communications unit at the location of the completion of the task.

11. The system according to claim 10, wherein the task being performed is the pick and drop of a load, and the task instructions providing information about the load being transported.

12. The system according to claim 1, wherein the wireless I/O used by the communications units operates in a radio frequency range.

13. A method of operating a decentralized work facility operating without a centralized host control system utilizing one or more automated guided vehicles (AGVs), into which functionalities of a facilities host control system have been incorporated, the method comprising:
  using facility based wireless I/O communications units to communicate over a limited distance to the AGVs information concerning tasks to be performed by the AGVs, said AGVs fitted with a wireless I/O communication unit;
  receiving the task information by the AGV through the AGV's wireless I/O communications units operating over a limited distance;
  using a route determination system onboard the AGV to determine a travel route for the AGV if the AGV is required to travel to one or more locations to perform an assigned task;
  using a navigation system onboard the AGV during travel to the one or more required locations via the determined route; and
  communicating via the wireless I/O communication unit of the AGV of information concerning the assigned task.

14. The method according to claim 13, wherein the wireless I/O communications units utilize digital signals and a processor or PLC to interpret said signals and logically filter said signals to facilitate communication between a wireless I/O communications unit on the AGV and wireless I/O communications units located at the facility.

15. The method according to claim 13, wherein the wireless I/O communications units utilize serial wireless communications employing predetermined messaging protocol.

16. The method according to claim 13, further comprising using a destination determining system onboard the AGV to determine the one or more destinations that the AGV needs to travel to perform its tasks.

17. The method according to claim 16, wherein the destination determining system determining the one or more destinations by:
  a. using the destination information provided with the task instructions sent to the AGV by the wireless I/O communications unit of the facility;
  b. utilizing a look-up table stored on the AGV that provides destinations corresponding to specified task; and
  c. querying a facility wireless I/O communications unit that is capable of providing the required destination information for the AGV.

18. The method according to claim 13, wherein the one or more facility based wireless I/O communications units are operationally connected to one or more of the following:
  a control wireless I/O unit manually operable to send instructions to the AGV;
  facility production machinery;
  facility conveyor;
  facility storage location;
  loading dock;
  facility battery charging station;
  facility battery exchange station;
  facility doors;
  facility elevator;
  facility gate; and
  facility powered ramp.

19. The method according to claim 13, further comprising transmitting communications from the AGV via the wireless I/O communications unit onboard the AGV to one or more locations at the facility associated with the AGV traveling to a destination to perform an assigned task.

20. The method according to claim 19, wherein the locations at the facility are selected from the group consisting of production units, manufacturing equipment, conveyors, doors, elevators, drop locations, storage locations, loading docks, powered ramps, and gates.

21. The method according to claim 13, wherein the AGV avoids collisions with other AGVs by broadcasting a coded signal via the AGV's wireless I/O communications units while traveling at the work facility, thereby to enable other AGVs in the vicinity to receive the coded signal and thereupon not enter the location of the AGV during the transmission of the coded signal by the AGV traveling at the facility.

22. The method according to claim 13, wherein the AGV navigates along a determined travel route by use of one or both:
  a laser navigation system that receives signals transmitted by the laser system that are reflected from known facility locations; and
  a natural navigation system using existing facility features that the navigation system has mapped so that the navigation system can determine the location of the AGV by recognizing the mapped facility features during the travel of the AGV.

23. The method according to claim 13, further comprising the AGV receiving data about the task being performed from the instructions sent to the AGV by the facility wireless I/O communications unit, the AGV transmitting updated data to the facility wireless I/O communications unit at the location of the completion of the task.

24. The method according to claim 23, wherein the task being performed is the pick and drop of a load, and the task instructions providing information about the load being transported.

25. The method according to claim 13, wherein the wireless frequency of the I/O communications unit operates within a radio frequency range.

* * * * *